June 29, 1943.  D. W. FENTRESS  2,322,796
WELDING APPARATUS
Filed April 28, 1941  2 Sheets-Sheet 2
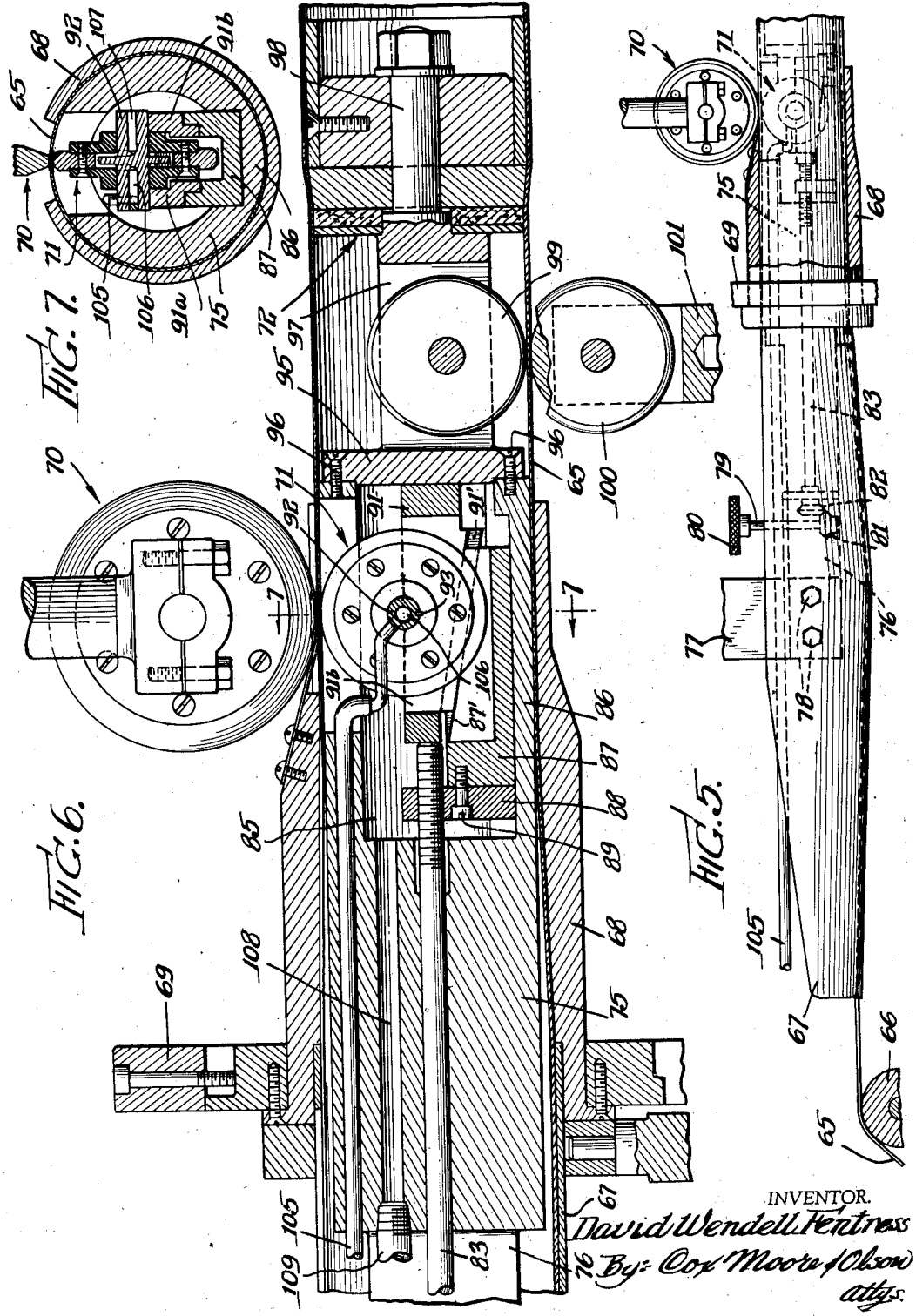
INVENTOR.
David Wendell Fentress
By: Cox Moore & Olson
attys.

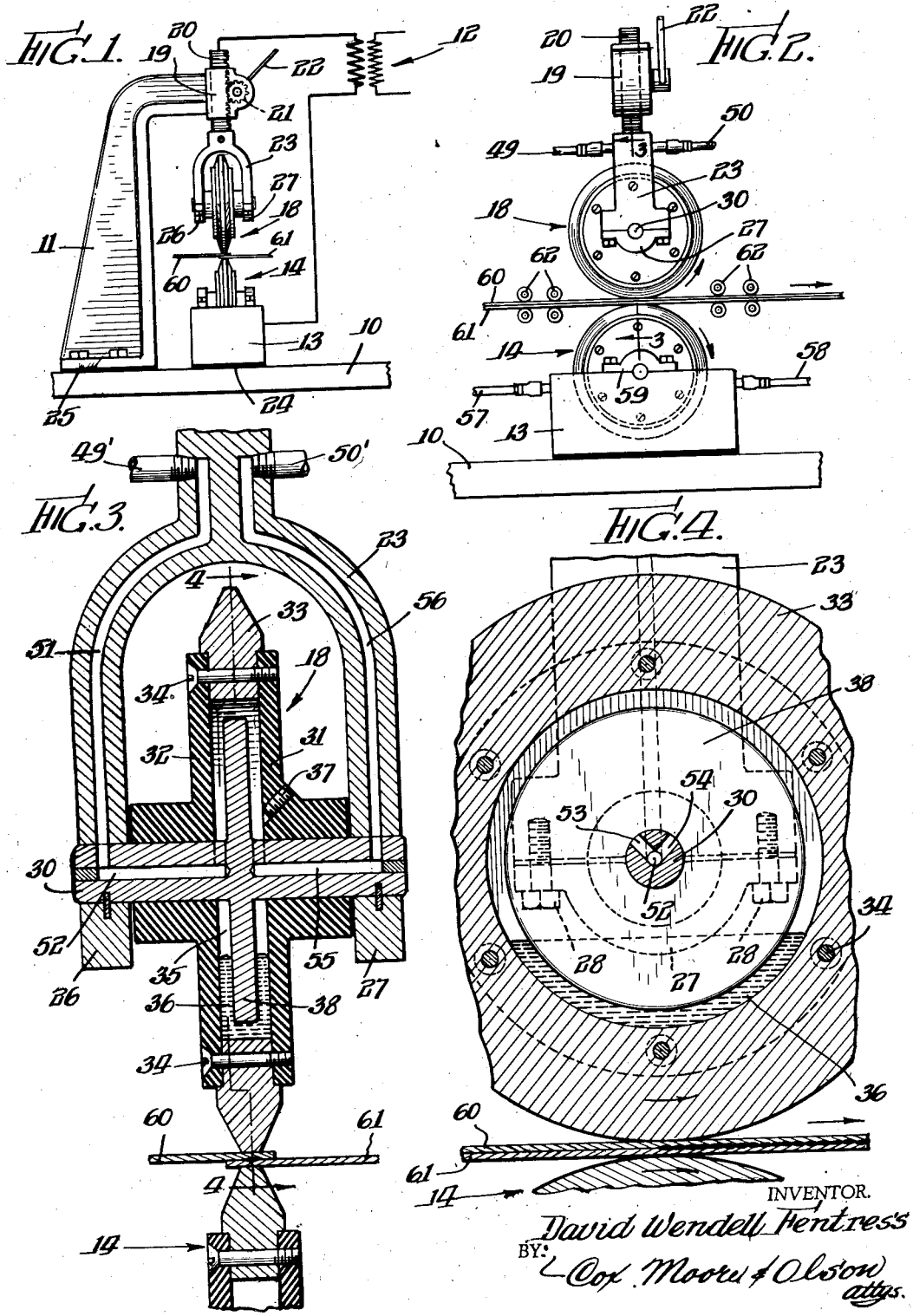

Patented June 29, 1943

2,322,796

UNITED STATES PATENT OFFICE 2,322,796

WELDING APPARATUS

David Wendell Fentress, Evanston, Ill., assignor to Chicago Metal Hose Corporation, Maywood, Ill., a corporation of Illinois Application April 28, 1941, Serial No. 390,668

17 Claims. (Cl. 219—4)

This invention relates to welding apparatus, and more particularly to electrode structures and means and methods for applying the welding current to the work pieces at the welding station.

It is an object of the invention to provide new and improved welding apparatus, and more particularly to provide new and improved electrode structures and mounting means therefor.

More specifically, it is an object of the invention to provide in welding apparatus having one or more roller or rotatable electrodes, means for eliminating sparking, arcing, pitting, or other deterioration of the electrodes and their mounting structures, whereby to provide for increased life and utility of the parts.

Another object of the invention is to provide welding apparatus particularly adapted for effecting welding operations within relatively confined or inaccessible areas and positions.

Still another object of the invention is to provide electrode structures of the type stated, wherein heating is minimized and wherein cooling is facilitated.

Various other objects, advantages and features of the invention will appear from the following specification when taken in connection with the accompanying drawings wherein certain preferred embodiments of the invention are set forth for purposes of illustration.

In the drawings, wherein like reference numerals refer to like parts throughout:

Fig. 1 is a general assembly view, somewhat diagrammatic in form, of a welding apparatus incorporating electrode structures constructed in accordance with the principles of the invention;

Fig. 2 is a side elevation of the structure illustrated in Fig. 1;

Fig. 3 is a sectional view of one of the electrodes, on an enlarged scale, and taken on the line 3—3 of Fig. 2;

Fig. 4 is a sectional view, on a similar enlarged scale, and taken on the line 4—4 of Fig. 3;

Fig. 5 is an illustrative view of a modified form of electrode and welding apparatus, particularly adapted for the welding of metal tubing;

Fig. 6 is a partial view of the apparatus of Fig. 5, on an enlarged scale; and

Fig. 7 is a sectional view on the line 7—7 of Fig. 6.

Referring more specifically to the drawings, and first to the embodiment set forth in Figs. 1 to 4 inclusive, the simplified welding apparatus set forth for purposes of illustration comprises in general a main frame 10, an electrode supporting bracket 11, and a welding transformer generally indicated by the numeral 12. More specifically, the frame 10 carries a pillow block 13 upon which a lower roller electrode, generally indicated by the numeral 14, is rotatably mounted. The upper roller electrode, generally indicated by the numeral 18, is carried by the support bracket 11, and to this end the support bracket at its upper end 19 is provided with a vertical bore adapted to receive a vertically reciprocable rack member 20. The vertical positioning of the rack member may be effected in any desired manner, and diagrammatically is indicated as being controlled by a pinion gear 21 in mesh with the gear teeth of the rack and controlled in its rotational movements by means of a manual control handle 22. The lower end of the rack carries a yoke member 23 in which the upper roller electrode is rotatably mounted.

One branch of the welding transformer secondary may be electrically connected to the rack 20, as diagrammatically shown in Fig. 1, the other branch of the secondary being electrically connected to the pillow block or support 13. Preferably the block 13 and the support bracket 11 are electrically insulated from the frame 10 of the machine by suitable insulation such as indicated at 24 and 25, the control handle 22 also being suitably electrically insulated, as will be understood by those skilled in the art.

In accordance with the principles of the invention, the upper and lower roller electrodes may be and preferably are similarly constructed, and it is believed that a specific description of one of them, the upper electrode 18, will suffice for an understanding of both. The roller electrode and its associated supporting structure, constituting a principal feature of the invention, is best illustrated in Figs. 3 and 4 of the drawings.

Referring to Figs. 3 and 4, and particularly to Fig. 3, it will be seen that the yoke member 23 is provided at its lower end with a pair of clamp members 26 and 27 held in position by a series of bolts 28. The clamp members clampingly engage and retain an electrode supporting axle or shaft member 30. This shaft is non-rotatably gripped by the clamps and thus normally, after assembly and during the operative functioning of the apparatus, in effect forms an integral part of the yoke structure.

The electrode structure proper specifically comprises a pair of side discs 31 and 32, and a welding element in the form of a tire or ring 33, the latter being clamped between the side discs and held in position by a series of bolts 34. In accordance with the invention, the side discs 31 and 32 are of insulating material, such as Bakelite or other suitable non-conducting plastic or the like, whereas the welding element 33 is of the usual electrode material, such as copper or copper alloy. The hub portions of the side discs are rotatably mounted upon the shaft 30.

It will be noted that the side discs, together with the welding ring 33, are so shaped as to form a chamber 35, internally disposed within the electrode structure. This chamber is adapted to receive a quantity of conductive liquid material, such as a mercury bath 36, as indicated in Figs. 3 and 4, the mercury being introduced into the chamber through a fill plug as indicated at 37. It is to be understood that after the mercury has been introduced into the chamber, the plug 37 is closed so that normally during operation the chamber 35, with its mercury bath, is sealed. Shaft 30 is provided with a circular flange 38, the lowermost portion of which is adapted to be continuously immersed in the mercury bath. The mercury thus forms an electrically conductive element between the non-rotatable flange 38 and the rotatable welding ring or tire 33, being directly engaged with both, and it will be seen that the flange 38 is in effect integral with the yoke 23, electrically connected to the rack 20 and the welding transformer.

For the purpose of electrode cooling, inlet and outlet coolant supply conduits 49 and 50, respectively, are provided, and the electrode and its associated supporting structures are provided with a series of coolant passageways in communication with these conduits. Conduits 49 and 50 are of rubber or the like to insure electrical insulation. More specifically, the yoke 23 is provided with a passageway 51, in fluid communication at its upper end with a fitting 49' associated with the inlet conduit 49, the yoke passageway communicating at its lower end with a passageway 52 extending axially into the shaft 30. The inner end of passageway 52 terminates in a pair of radial passageways 53 and 54, Fig. 4, by means of which the coolant liquid is introduced into the internal electrode chamber 35. The coolant circulates within the chamber, for cooling purposes, and eventually finds its way to a pair of radial passageways communicating with the inner end of an axial passageway 55 disposed at the opposite end of shaft 30, and communicating at its outer end with the yoke passageway 56 leading to a fitting 50' connected to the outlet conduit 50.

Referring to Fig. 2, the coolant conduits associated with the lower electrode are indicated at 57 and 58, respectively. The lower electrode clamp member corresponding to the clamp 27 for the upper electrode is indicated at 59.

The apparatus is illustrated as being adapted for the welding of a pair of work pieces 60 and 61 adapted to be fed to and from the welding station by a series of guide and feed rolls 62. As the work is passed between the electrodes, the electrode rollers rotate and effect the welding operation. In operation, it will be noted that the welding current is passed into the welding elements without transmission through any relatively rotatable bearing surfaces, sparking, arcing, pitting, or other deterioration of such bearing surfaces being thereby avoided. More particularly, referring to the upper electrode structure, it will be noted that the discs 31 and 32, the hub portions of which have rotatable bearing engagement with the shaft 30, are of non-conducting or insulating material so that no electric current passes through the relatively rotatable bearing surfaces between the disc hubs and the axle shaft. On the contrary the transmission of the electric current takes place only through structures which in effect are integral during operation, such as the rack 20, the yoke 23, and the axle 30 with its associated flange 38; and then by means of the mercury bath directly to the ring or welding element 33. Obviously the discs 31 and 32 need not be entirely made of insulating material so long as the hub portions thereof engageable with the shaft 30 are of such material.

Due to the fact that there is no passage of electric current through high resistance members, or between relatively rotatable poor contact surfaces, heating is minimized. In this connection it is to be understood that the yoke member 23 and axle shaft 30 with its associated flange 38 will preferably be formed of brass, copper alloy, or other suitable metal of high electrical conductivity. Further, the electrode structure, by means of the cooling arrangement described, is well adapted for internal cooling and cooling at the places and points subjected to the greatest heating effects. A wholly symmetrical structure is provided, electrically, mechanically, and in so far as cooling is concerned. The mercury bath, being directly in contact with the welding element 33, furnishes a direct source of supply thereto. It is further to be noted that the ring or element 33 may be replaced or changed as to size by the removal of bolts 28 and 34, without replacement of the other structural elements.

In instances wherein the electric current is transmitted through relatively rotatable bearing surfaces, in an effort to reduce the current density and thus reduce arcing, sparking and deterioration of the parts in so far as may be possible, the bearing surfaces are required to be relatively large. In contradistinction to such a structure, it will be noted that in accordance with the present invention the shaft 30 for example need be made only sufficiently large to withstand the mechanical strains imparted thereto by the pressure of the welding roller against the work. To this end a smaller and more compact electrode structure is produced which is well adapted for use within confined and inaccessible spaces, for example within tubing, inside box constructions, and the like. An illustrative embodiment wherein the electrode structure is used for effecting the welding of metal tubing, which may be of relatively small size, is shown in Figs. 5, 6 and 7.

Referring more specifically to Figs. 5, 6 and 7, and first to Fig. 5, the apparatus illustrated is adapted for the continuous formation of longitudinally seam welded tubing from elongated strip stock. More particularly, an elongated flat strip 65, Fig. 5, of which the tubing is to be formed, is fed from a suitable supply roll or the like over a guide roller 66 and into the receiving end of a forming and shaping trough 67. As the strip is passed through this forming and shaping trough, it is shaped into cylindrical form, so that as it leaves the trough and arrives at the welding station, it is in generally cylindrical shape with the strip edges in adjacent overlapping relation. The general structure, in so far as the feeding and shaping of the strip is concerned, may be similar to that set forth in the application of Albert Dreyer, Serial No. 268,239, filed April 17, 1939, now issued as Patent No. 2,262,423, dated November 11, 1941, and entitled Welding method and apparatus.

As the strip leaves the forming and shaping trough 67, it passes through a cylindrical guide tube 68, Fig. 6, adjustably carried by a frame member 69, by means of which it is delivered to the upper and lower welding rollers generally indicated by the numerals 70 and 71. It will be understood that the overlapped strip edges are brought between the welding rollers and welded thereby. As the welded tubing leaves the welding station it is drawn over a tubing calibrating assembly, generally indicated by the numeral 72, by means of which the tube is calibrated and brought to predetermined size. The tube is drawn through the shaping and forming trough, past the welding station, and over the calibrating assembly by suitable feeding means (not shown) adapted to grip the outfeed end of the tubing, to the right, as shown in Figs. 5 and 6.

The upper welding roller 70 may be of a character generally similar to that heretofore described in reference to Figs. 1 to 4 inclusive, and further description is believed to be unnecessary. The lower welding roller is likewise similar to that previously described, but is provided with mounting devices specifically adapting it to be adjustably positioned within the tubing structure.

More specifically, the lower roller electrode is supported through the intermediary of a generally cylindrical frame member 75 adapted to be arranged and supported within the tube. This frame 75 is provided at its outer end with a pair of laterally spaced extensions 76 adjustably secured to a support structure 77 by adjustable bolts or the like 78. The support structure 77 thus adjustably supports the frame 75 within the guide tube 68 and within the tubing to be welded. Arranged between the spaced extensions 76 is an electrode adjusting or positioning control means consisting of a vertical shaft 79 and associated hand-wheel 80; said shaft, by means of bevel gearing 81 and 82, being adapted to adjustably position a shaft 83 extending longitudinally of the frame 75. It will be understood that the shaft 79 and the support structure 77 extend upwardly through the open portion of the shaping and forming trough 67, the forming trough being flat and open at its infeed end, to the left, as seen in Figs. 5 and 6, and being shaped progressively into cylindrical form.

The inner end of the frame 75 is formed with a chamber 85 adapted to receive the lower roller electrode and its associated supporting structures. More specifically, the lower portion of the frame adjacent the chamber is provided with a track 86 along which an adjusting frame 87 is adapted to be horizontally movable longitudinally of the tube. An end plate 88 is secured to the frame 87 by means of bolts 89, and this end plate has screw threaded engagement with the adjustment shaft 83, so that as the latter is rotated by means of hand-wheel 80, the adjusting frame 87 may be horizontally moved to the desired position along the track 86.

The adjusting frame 87 is further provided with an inclined track portion 87' adapted to support an electrode support frame 91 by means of a similarly formed inclined track 91' formed on the support frame. The support frame 91 is generally rectangular in horizontal section, its side walls 91a and 91b being adapted to support the electrode axle shaft 92, as will be best understood by reference to Fig. 7. Shaft 92 may be clamped to the support frame if desired, as previously described with reference to Figs. 1 to 4 inclusive, but as shown is merely laid within semi-circular recesses within the support frame side walls, the pressure engagement of the electrodes and a dowel pin 93 being relied upon to maintain the shaft 92 non-rotatable upon the support frame during the operation of the apparatus. It will be understood that the roller electrode 71 is rotatably mounted on the shaft 92, as in the embodiment previously described.

As best shown in Fig. 6, one end wall of the support frame 91 is adapted to abut against the end of shaft 83, whereas the opposite end wall of the frame abuts against an end plate 95 secured to the main cylindrical frame 75 by suitable means such as bolts 96. It will be seen that the support frame 91 is thus constrained against horizontal movement, so that as the adjusting frame 87 is horizontally positioned through the shaft 83, the electrode support frame 91, through the intermediary of the cooperating inclined tracks 87' and 91', will be vertically shifted to effect the vertical positioning of the lower electrode structure.

The end plate 95 is provided with a yoke extension 97, the end of which carries a bolt 98 for supporting the calibrating assembly 72. A support roller 99 is also journaled in the extension 97, this support roller cooperating with a support roller 100 journaled in a machine frame member 101. The support rollers 99 and 100 cooperate to form an auxiliary support means for the frame 75, aiding in maintaining the proper pressure engagement of the electrodes at the welding station.

To effect the cooling of the lower electrode and associated parts, a coolant supply conduit 105 is arranged within the frame 75, the inner end of this conduit having fluid communication with an inlet channel 106 formed within the shaft 92. The outlet channel 107 of shaft 92 exhausts into the chamber 85 from which the coolant is returned by means of a channel 108 formed in the frame 75 and an associated outlet pipe 109.

The operation of the apparatus, as set forth in Figs. 5, 6 and 7, is believed to be clear from what has been hereinbefore set forth. It is to be understood that the electric current may be conducted to the lower electrode through the support elements 77, 75, 87 and 91 to the shaft 92, which are all relatively fixed during the welding operation, whereby to avoid the transmission of the electric current through any relatively moving bearing surfaces. It will be understood that these elements, and their associated current conducting parts, are preferably formed of brass, copper alloy, or other metal of good electrical conductivity, whereas the coolant conduits 105 and 109 are of rubber or otherwise insulated. It will further be noted that the lower electrode structure, due to its compactness and reduced size as constructed in accordance with the principles of the invention, enables the longitudinal seam welding by means of roller electrodes of relatively small size tubings as to which conventional methods may not be used.

It is obvious that various changes may be made in the specific embodiments of the invention set forth for purposes of illustration without departing from the spirit of the invention. Accordingly, the invention is not to be limited to the precise embodiments shown and described, but only as indicated in the following claims.

The invention is hereby claimed as follows:

1. Electric welding apparatus comprising a rotatable electrode having an electrode element and an electrically non-conductive rotatable bearing surface, and a support structure for said electrode including an electrically conductive non-rotatable bearing surface adapted for bearing engagement with the rotatable bearing surface of the electrode, and means electrically connecting said electrode element and said electrically conductive non-rotatable bearing surface.

2. Electric welding apparatus comprising a rotatable electrode, a relatively fixed support axle for the electrode, and a body of electrically conductive fluid forming an electrical connection between the rotatable electrode and said support axle, a portion of said electrode and a portion of said support axle being in constant engagement with said fluid body during rotation of the electrode, and said conductive fluid forming the sole path of current travel between said electrode and said axle.

3. Electric welding apparatus comprising a rotatable electrode, a non-rotatable support axle therefor, means for rotatably supporting the electrode on the support axle, said means being electrically non-conductive, and means including a body of electrically conductive fluid forming an electrical connection between said electrode and said support axle, said fluid body forming the sole path of current travel to the electrode.

4. Electric welding apparatus comprising a rotatable electrode having an electrode element and an electrically non-conductive rotatable bearing surface, a non-rotatable support axle for the electrode, said support axle having an electrically conductive non-rotatable bearing surface adapted for bearing engagement with said electrode rotatable surface, and means including a bath of electrically conductive fluid in continuous engagement during electrode rotation with said electrode element and said axle whereby to form an electrical connection therebetween.

5. An electrical welding apparatus comprising a rotatable electrode structure, said electrode structure including an electrode ring and a pair of insulating discs for supporting the ring, said discs being provided with electrically non-conductive bearing hubs, a support structure for the electrode including a non-rotatable axle of electrically conductive material upon which said bearing hubs are rotatably mounted, means for supplying electric current to said axle, and a bath of electrically conductive fluid within the electrode structure and adapted for continuous contact with said axle and said electrode ring during electrode rotation.

6. An electric welding apparatus as defined in claim 5 wherein means is provided for introducing coolant material into the electrode structure and into contact with said fluid bath during electrode rotation.

7. An electrical welding apparatus comprising a rotatable electrode structure, said electrode structure including an electrode ring and a pair of insulating discs for supporting the ring, said discs being provided with electrically non-conductive bearing hubs, a support structure for the electrode including a non-rotatable axle of electrically conductive material upon which said bearing hubs are rotatably mounted, means for supplying electric current to said axle, a bath of electrically conductive fluid within the electrode structure and adapted for continuous contact with said axle and said electrode ring during electrode rotation, fluid channels disposed in said axle in communication with the interior of the electrode structure, and means for supplying coolant fluid to said channels whereby coolant may be supplied directly into contact with said bath of electrically conductive fluid.

8. Electric tube welding apparatus comprising a rotatable electrode, a non-rotatable support structure therefor, means for rotatably supporting the electrode on said support structure, said means being electrically non-conductive, means comprising a pair of relatively shiftable cams for shifting the electrode relative to the support structure, means for mounting said electrode and support structure internally of the tube to be welded whereby said electrode may engage the internal tube surface during the welding operation, and an electrically conductive fluid bath forming an electrical connection and the sole electrical connection between the electrode and its support structure.

9. Electric tube welding apparatus comprising a rotatable electrode, a non-rotatable support structure therefor, means comprising a bath of electrically conductive fluid forming an electrical connection between said electrode and said support structure, said bath forming the sole path of electrical current travel between the electrode and said support structure, and means for mounting said electrode and support structure including said fluid bath internally of the tube to be welded whereby said electrode may engage the interior tube surface during the welding operation.

10. Electric tube welding apparatus comprising a rotatable electrode, a non-rotatable support axle therefor, means for rotatably supporting the electrode on said support axle, said means being electrically non-conductive, means including a bath of electrically conductive fluid forming an electrical connection between said electrode and said support axle, and means for mounting the electrode and support axle and said fluid bath internally of the tube to be welded, said mounting means including means for shifting the electrode and said axle toward and away from the interior surface of the tube at the welding station.

11. Electric tube welding apparatus comprising a rotatable electrode, a non-rotatable support structure therefor, means for rotatably supporting the electrode on the support structure, means for mounting the electrode and support structure internally of the tube to be welded, means including a control member disposed exteriorly of the tube for shifting the electrode toward and away from its support structure whereby to adjust the position of the electrode in respect to the interior surface of the tube at the welding station, and an electrically conductive fluid bath forming an electrical connection and the sole electrical connection between the electrode and its support structure.

12. An electrical welding apparatus comprising a rotatable electrode structure, said electrode structure including an electrode ring and a ring support, said ring and support being arranged to form a chamber internally of the electrode structure, an electrically conductive axle upon which the electrode structure is rotatably mounted, and a bath of electrically conductive fluid disposed within the chamber of the electrode structure and adapted to remain in operative contact with said axle and with the electrode ring during electrode rotation.

13. An electrical welding apparatus comprising a rotatable electrode structure, said electrode structure including an electrode ring and a pair of discs adapted to engage opposite faces of the ring and adapted to be removably secured thereto, said discs and said electrode ring forming a chamber within the electrode structure, an axle upon which the electrode structure is rotatably mounted, said axle being provided with a flange projecting into the chamber of the electrode structure, and a bath of electrically conductive fluid in contact with said flange and with said electrode ring and adapted to remain in continuous contact therewith during electrode rotation.

14. Electric tube welding apparatus comprising a rotatable electrode structure, said electrode structure being provided with an internally disposed chamber, a stationary axle upon which the electrode structure is rotatably mounted, a bath of conducting fluid electrically connecting the electrode structure with said axle, a support block for supporting the axle, said support block and electrode structure being adapted to be mounted within the tube to be welded, and means for adjusting the support block relative to the tube whereby to vary the position of the electrode in reference to the tube surface.

15. Electric tube welding apparatus comprising a rotatable electrode structure, said electrode structure comprising an electrode ring and a pair of ring supports adapted to engage opposite ring faces, said ring and ring supports forming a chamber disposed internally of the electrode structure, an axle upon which the ring supports are rotatably mounted, a body of electrically conductive fluid in said chamber and in contact with the electrode ring and said axle, a support block for the axle, and means for mounting the support block and the electrode structure within the tube to be welded.

16. Electrical welding apparatus comprising a rotatable electrode structure, a relatively fixed support axle for the electrode, means forming a hollow and sealed chamber within the electrode structure, and a body of electrically conductive fluid within said chamber forming an electrical connection between the rotatable electrode structure and said support axle, a portion of said electrode structure and a portion of said support axle being in constant engagement with said fluid body during rotation of the electrode.

17. Electrical welding apparatus comprising a rotatable electrode, a relatively fixed support structure for the electrode, said support structure including means for rotatably mounting said electrode upon a substantially horizontal axis, and a body of electrically conductive fluid forming an electrical connection between the rotatable electrode and said support structure, a portion of said electrode and a portion of said support structure being in constant engagement with said fluid body during rotation of the electrode, and said conductive fluid forming the sole path of current travel between said electrode and said support structure.

DAVID WENDELL FENTRESS.